United States Patent [19]

Murakami et al.

[11] 4,248,750
[45] Feb. 3, 1981

[54] COMPOSITIONS FOR FORMING PEELABLE FILMS

[75] Inventors: Ichiro Murakami; Shosaku Sasaki; Masamitsu Tanimura, all of Ichihara, Japan

[73] Assignee: Toray Silicone Company, Ltd., Tokyo, Japan

[21] Appl. No.: 36,896

[22] Filed: May 7, 1979

[30] Foreign Application Priority Data

Jun. 26, 1978 [JP] Japan ................... 53-76447

[51] Int. Cl.³ ............................................. C08J 3/00
[52] U.S. Cl. ............................... 260/29.1 SB; 528/15; 528/31; 528/32; 525/478
[58] Field of Search ............... 528/15, 31, 32, 478; 260/DIG. 16, DIG. 17, 29.1 SB

[56] References Cited

U.S. PATENT DOCUMENTS

| | | | |
|---|---|---|---|
| 3,933,880 | 1/1976 | Bergstrom et al. | 528/15 |
| 4,024,091 | 5/1977 | Lee et al. | 528/15 |
| 4,026,843 | 5/1977 | Kittle | 528/31 |
| 4,026,844 | 5/1977 | Kittle et al. | 528/15 |

*Primary Examiner*—Melvyn I. Marquis
*Attorney, Agent, or Firm*—George A. Grindahl

[57] ABSTRACT

Improved compositions for forming pellable films, such as adhesive-release backings, are disclosed which have antistatic characteristics, decreased peeling resistance with respect to adhesives and a more stable peeling efficiency with respect to aging.

The improved compositions of this invention comprise a curable mixture of a vinyl-containing organopolysiloxane, an SiH-containing organopolysiloxane and a metal addition-catalyst which has mixed therewith an alcohol- and/or polyether-modified organopolysiloxane.

This use of an alcohol- and/or polyether-modified organopolysiloxane provides a decreased static charge, less dust attraction, less blocking and better adhesive coating for the cured pellable film.

4 Claims, No Drawings

4,248,750

COMPOSITIONS FOR FORMING PEELABLE FILMS

BACKGROUND OF THE INVENTION

This invention concerns compositions for forming peelable films. More precisely, it concerns curable organopolysiloxane compositions for forming peelable films which can be lightly peeled from adhesive substances and which are stable with time.

It is known that organopolysiloxane compositions which cure by condensation or addition reactions can provide for a base material the property of peelability from adhesives substances by forming curable films on the surface of base materials, such as various types of papers, synthetic films, natural and synthetic fibers and glass fabrics. These compositions are widely used in applications such as labels, tapes, processed papers and packages for asphalt and pitch.

Curing by an addition reaction is superior to curing by a condensation reaction because the application conditions minimally affect the application time and the productivity of the former is higher because the curing rate is faster. In terms of the peeling efficiency, the peeling resistance of the former system is low and its peeling rate is relatively unaffected by external conditions. Thus, the former system has recently come to be utilized in a variety of fields.

However, problems with an addition reaction system arise more easily during processing due to static electricity. In addition, the peeling efficiency of processed peelable papers is unstable due to the effects of the atmosphere. If labels and tapes are processed using peelable papers which have been exposed to the atmosphere, the initial peeling resistance is high and increases with time. If certain adhesives are used, the paper cannot be peeled at all.

The application of common hydrocarbon anti-electrostatic agents not only causes a decline in the peeling efficiency, but also cause a large decline in adhesion to the above-mentioned bases. Thus, the application of such an agent is impractical. The inventors investigated methods for overcoming the above-mentioned drawbacks.

SUMMARY OF THE INVENTION

It is an object of this invention to provide improved compositions having antistatic characteristics in the cured state.

It is another object of this invention to provide improved compositions which cure to form peelable films which have decreased peeling resistance with respect to adhesives.

It is a further object of this invention to provide improved compositions which cure to form peelable films having a stable peeling efficiency with respect to time.

Briefly stated, the present invention accomplishes these and other objects by incorporating alcohol- and-/or polyether-modified organopolysiloxanes in organopolysiloxane compositions which cure to the solid state by way of an addition reaction.

These compositions for forming peelable films exhibit the following characteristics compared to conventional organopolysiloxane compositions which consist of vinylmethylpolysiloxane, methylhydrogenpolysiloxane and platinum for catalysis:

(1) When they are coated on a base such as various types of glassine papers, polyethylene-paper laminates and synthetic films, the production of static electricity is minimal. As a result, the production of pin holes is minimized. The coating can be carried out uniformly with a small quantity of coating material.

(2) "Dust", which adversely affects peeling efficiency, is insignificantly adhered to the cured film.

(3) Although the cured film surface may be exposed to the atmosphere, the effect of this on the peeling efficiency is minimal. For conventional organopolysiloxane compositions which cure by addition reactions, the initial peeling becomes more difficult after exposure of the cured film surface to the atmosphere and becomes even more difficult with time. Thus, these compositions were unsuitable in practice. In the case of the present compositions for forming peelable films, these effects are absent and a stable peeling efficiency can be obtained.

(4) When the labels and tapes are processed by coating the cured film with an adhesive, cissing of the adhesive coating does not occur due to the low level of static and the workability is excellent.

(5) The curability is excellent. Blocking does not appear between cured film surfaces or between the back surfaces of various bases and the cured film surface.

DETAILED DESCRIPTION OF THE INVENTION

This invention relates to improved curable compositions for forming peelable films, said compositions being obtained by mixing components comprising (a) an organopolysiloxane having a viscosity greater than 100 cP at 25° C. and having at least two silicon-bound vinyl groups per molecule; (b) an organohydrogenpolysiloxane containing at least two silicon-bound hydrogen radicals per molecule; and (c) a catalytic amount of a metal catalyst for an addition reaction of silicon-bound vinyl groups with silicon-bound hydrogen radicals, the improvement comprising incorporating in the curable composition (d) at least one component selected from the group consisting of alcohol-modified organopolysiloxanes and polyether-modified organopolysiloxanes, there being in the improved composition from 1 to 40 parts by weight of component (d) for every 100 parts by weight of the total of components (a) and (b).

The components of these compositions for forming peelable films will be described in detail in the following. Component (a), an organopolysiloxane, consists of siloxane units with the average formula

where a is a number of from 1.9 to 2.05, R is a monovalent hydrocarbon group such as a methyl, ethyl, propyl, vinyl or phenyl group and at least more than 50% of these monovalent hydrocarbon radicals are preferably methyl groups. The viscosity of this organopolysiloxane exceeds 100 cP at 25° C. and the organopolysiloxane is itself a straight chain or branched chain polymer containing at least two or more Si-bound vinyl groups per molecule. If the viscosity at 25° C. is less than 100 cP, the film strength is low. Thus, a compound with a viscosity greater than 100 cP must be used.

The molecule's endgroups are not critical and can be hydroxyl or hydrocarbon, such as methyl, vinyl or phenyl groups. The Si-bound vinyl groups can be present either in the main chain or at the end or in both positions.

Component (b) is a conventional organohydrogenpolysiloxane which contains at least two SiH groups i.e. silicon-bound hydrogen radicals, per molecule. Its molecular shape and viscosity are not critical. Cyclic, linear or branched molecules are generally used. The viscosity of these molecules at 25° C. ranges from a few cP to a few thousands cP. The SiH group can be present either in the main chain or at the end or in both positions. Examples are tetramethyltetrahydrogencyclotetrasiloxane, methylhydrogenpolysiloxane with methyl or hydrogen endgroups, a copolymer of a methylhydrogensiloxane with methyl or hydrogen endgroups and dimethylsiloxane and a copolymer of a methylhydrogensiloxane with methyl endgroups and methylphenylsiloxane.

Component (c) is a metal catalyst for addition reactions. This catalyst is one generally used in the addition reaction between Si-bound vinyl groups and Si-bound hydrogen radicals. Representative examples are platinum or platinum compounds. The following platinum compounds are applicable: chloroplatinate, alcohol-modified chloroplatinate, platinum-olefin complexes, platinum-vinylsiloxane complexes or platinum metal supported on alumina or silica. In addition, tetrakis(triphenylphosphine)palladium, a mixed catalyst of palladium-black and triphenylphosphine or a rhodium catalyst can be used. However, platinum or platinum compounds are more suitable.

Component (d), an alcohol-modified organopolysiloxane and/or a polyether-modified organopolysiloxane, is the characteristic component of this invention. The application of this component reduces the production of static during coating or after curing, i.e., it provides an antistatic character. As a result, a uniform coat can be produced. After curing, little dust will adhere and an adhesive may be easily applied. In addition, the peeling efficiency changes very little with time. This component increases antiblocking.

The alcohol-modified organopolysiloxane is an organopolysiloxane in which the carbon atom of an alcohol is directly bonded to a silicon atom. In terms of its effect, it is preferable that the alcohol component be derived from lower alcohols and that a multiple number of alcohol groups be present in one molecule.

The molecular shape and the viscosity of this organopolysiloxane are not critical. Cyclic, linear or branched molecules are generally used. The viscosity of these molecules at 25° C. ranges from a few cP to a few thousand cP. The organic groups in such an organopolysiloxane are methyl, ethyl, propyl, vinyl, phenyl, trifluoropropyl and phenylethyl; however, methyl is the most common. In addition to the organic groups, small quantities of hydroxyl groups or SiH groups can be present.

The presence of a vinyl, Si-bonded hydroxyl or SiH group is also preferable to provide a permanent durability of effect due to chemical bonds formed with components (a) and/or (b) during curing. Representative structures of alcohol-modified organopolysiloxanes are as follows:

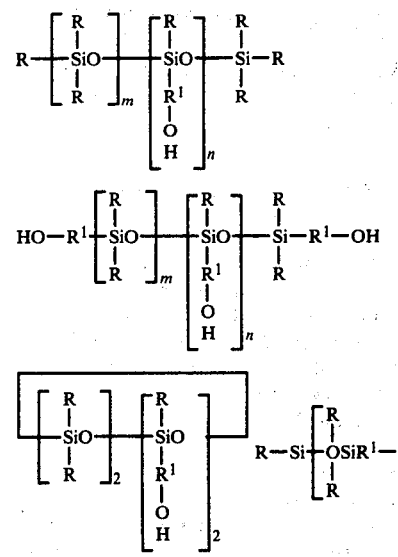

where R is a monovalent organic group, $R^1$ is alkylene group, m and n are positive integers and R and $R^1$ can be identical or different if a multiple number of such groups are present in the same molecule.

Such an organopolysiloxane can be prepared by an addition reaction involving vinyl-substituted alcohols and an organohydrogenpolysiloxane.

The polyether-modified organopolysiloxane is an organopolysiloxane in which the carbon or oxygen atom of a polyether is directly bonded to a silicon atom. Polyethers have a degree of polymerization greater than two; however, the upper limit on the degree of polymerization is not critical. From the standpoint of ease of preparation and handling, the degree of polymerization is generally preferred to be below 20–30. The polyethers are of the polyoxyalkylene type where the alkylene groups include groups such as ethylene, propylene and butylene groups.

At least one polyether group may be present per organopolysiloxane molecule. The molecular shape and viscosity of such an organopolysiloxane are not critical. Linear, branched or cyclic molecules are generally used. The viscosity of such molecules at 25° C. ranges from a few cP to a few thousand cP. Methyl is the most common organic group in such an organopolysiloxane; however, other organic groups, such as ethyl, propyl, vinyl, phenyl, trifluoropropyl and phenylethyl can be present.

In addition to these organic groups, small quantities of silicon-bonded hydroxyl and SiH groups can be present. The presence of vinyl, Si-bonded hydroxyl or SiH groups is also preferred to provide a permanent durability of effect due to chemical bonds formed with components (a) and/or (b) during curing.

Representative structures of polyether-modified organopolysiloxanes are as follows:

-continued

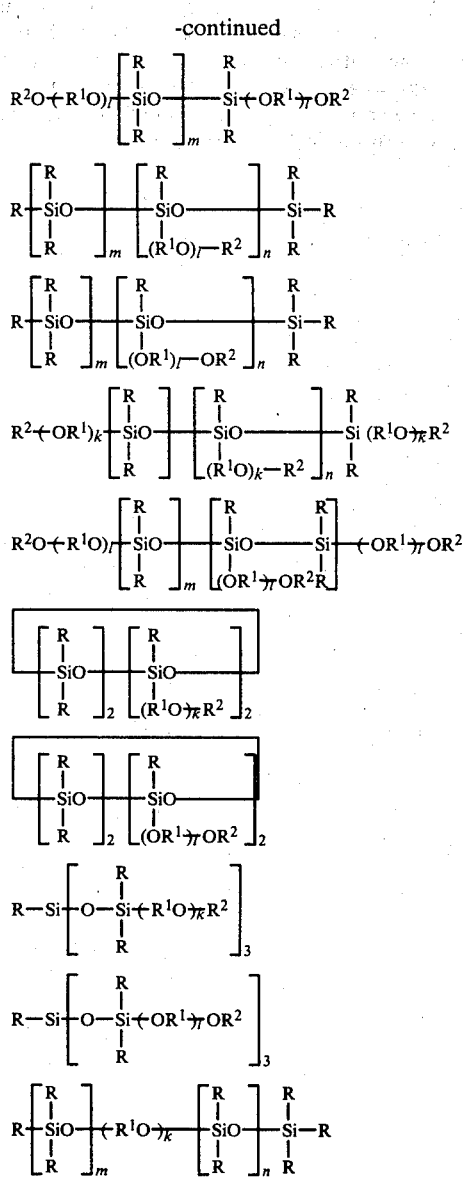

where R, $R^1$ m and n retain their definitions from above, $R^2$ is a hydrogen radical or an inactivating endgroup such as an alkyl group, k is an integer greater than 2, l is an integer greater than 1 and R, $R^1$ and $R^2$ can be identical or different groups if a multiple number of such groups are present in the same molecule. Such an organopolysiloxane can be prepared by the addition reaction of vinyl-substituted polyethers to an organohydrogenpolysiloxane or by the condensation reaction of hydroxyl-substituted polyethers with an organopolysiloxane containing Si-bonded chlorine.

Component (d) may also be an organopolysiloxane modified both by alcohols and polyethers and/or a mixture of said alcohol- and polyether-modified organopolysiloxanes.

The mixing ratio of component (a) to component (b) is such that the ratio of total Si-bonded vinyl groups in component (a) to total SiH groups in component (b) preferably ranges from 2/1 to 1/10 and optimally from 1/1 to 1/5. The quantity of addition of component (c), as metal, ranges from approximately 10 to 1000 parts by weight per one million parts by weight of (a) plus (b).

The quantity of addition of component (d) ranges from 1 to 40 parts by weight per 100 parts by weight of the total components (a) and (b). If less than one part by weight of component (d) is present, the desired antistatic character cannot be obtained. If the level of this component exceeds 40 parts by weight, the coatability and release efficiency appear to be adversely affected.

The present compositions for forming peelable films are simply prepared by blending the above-mentioned components (a) through (d) homogeneously.

A compound must be present from each class of components and two or more compounds may be present from the same class of components. The method of addition and the conditions of blending are not critical in this invention.

The prepared compositions of this invention for forming peelable films can be used directly. Based on a consideration of workability during coating and processing on various types of bases, they may be dissolved in aromatic hydrocarbons such as benzene, toluene and xylene; aliphatic hydrocarbons such as heptane, hexane and pentane; halogenated hydrocarbons such as trichloroethylene and perchloroethylene; ethyl acetate and methyl ethyl ketone. In addition, agents which inhibit the addition reaction between silicon-bound hydrogen and silicon-bound vinyl, colorants and pigments can be added.

The present compositions for forming peelable films can form cured films which have excellent hardness and an adhesiveness for various types of base materials such as various types of papers, synthetic films, fibers, aluminum and glass cloth. These films exhibit a stable peeling efficiency with respect to adhesives due to a minimal production of static. Since the film's coatability is superior, fluctuations in the peeling efficiency based on the amount coated are minimal. Thus, the amount coated can be minimized.

Examples of this invention will be explained in detail in the following. The surface potential, peeling resistance, residual adhesiveness, and blocking were measured as follows:

Surface potential: A certain quantity of the composition of this invention was coated on a base material to form a cured film. The film was left standing in a thermo-hygrostated room at 25° C. and 60% relative humidity for one day.

The surface of the cured film was rubbed using a Kyodai Kaken rotary static tester and the surface potential in volts (V) was measured.

Peeling resistance: As in the surface potential test, a cured film was formed on the same base material. An acrylic adhesive, Olibain BPS-5127 produced by Toyo Ink Manufacturing Co., Ltd., or SK Daine 801B produced by Soken Kagaku K.K., was coated on the surface of the prepared film. The film was heat treated at 80° C. for two minutes.

A paper was placed on the adhesive and a 20 g/cm² load was placed on the test specimen for aging at 25° C. for a specified time. After aging, the adhered paper was peeled at an angle of 180° using a tensile tester. The force required for peeling (g) was determined.

Residual adhesiveness: As in the surface potential test, a cured film was formed on the same base material. Nitto Polyester Tape 31B produced by Nitto Electric Industrial Co., Ltd., was adhered on the film's surface.

A 20 g/cm² load was placed on top of the test specimen. The specimen was heat treated at 70° C. for 20 hours. The tape was peeled off and was pasted on a stainless steel plate #280. The force required to peel this treated tape from a stainless steel plate was determined. The percentage of this measured force based on the force required to peel on untreated standard tape from the stainless steel plate was calculated.

Blocking: As in the surface potential test, a cured film was formed on the same base material. The cured film was laminated and a load of 100 kg/cm² was placed on the laminate. The laminate was heat-treated at 50° C. for 16 hours. The force required to peel the laminate (g) was measured.

EXAMPLE 1

A methylvinylpolysiloxane (97 mol % dimethylsiloxane units and 3 mol % methylvinylsiloxane units) with a viscosity of 2,000 cP at 25° C. in which both ends were sealed with dimethylvinylsilyl groups (100 parts by weight) was combined with a methylhydrogenpolysiloxane which had a viscosity of 20 cP at 25° C. in which both terminals were sealed with trimethylsilyl groups (5 parts by weight) and a polyether-modified organopolysiloxane with the following formula:

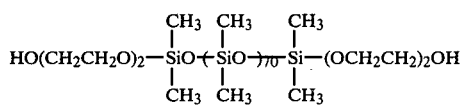

(5 parts by weight and 15 parts by weight) to give specimens 1 and 2, respectively. As a comparison example, the above-mentioned methylvinylpolysiloxane (100 parts by weight) was combined with the above-mentioned methylhydrogenpolysiloxane (5 parts by weight) to produce a comparison specimen 1.

250 ppm platinum, as chloroplatinate, based on the total of methylvinylpolysiloxane and methylhydrogenpolysiloxane were added to each of these three compositions. These compositions were coated at 0.7 g/m² on a polyethylene-kraft paper laminate. A cured film was formed by heating the coated film at 150° C. for 20 seconds. The coated paper was allowed to stand in air for 30 minutes with the cured film surface on top. An adhesive, SK Daine 801B, was then applied and the applied surface was heated for drying.

The results of the tests are reported in Table I.

For specimens 1 and 2, the surface potential was relatively low and the peeling resistance was extremely stable. The residual adhesiveness was excellent. Thus, there was little interference with the adhesiveness of the adhesive.

TABLE I

| | Surface potential V | Peeling resistance, g/5 cm | | Residual adhesiveness % | Blocking g/4 cm |
| --- | --- | --- | --- | --- | --- |
| | | After aging for one day | After aging for 30 days | | |
| Specimen 1 | 1500 | 17 | 21 | 91 | 4 |
| Specimen 2 | 800 | 14 | 15 | 89 | 4 |
| Comparison Specimen 1 | 5200 | 28 | 75 | 93 | 4 |

EXAMPLE 2

A methylphenylvinylpolysiloxane (85 mol % dimethylsiloxane units, 11 mol % methylphenylsiloxane units and 4 mol % methylvinylsiloxane units) with a viscosity of 5,000 cP at 25° C. in which both ends were sealed with methylphenylvinylsilyl groups (100 parts by weight) was combined with a methylhydrogenpolysiloxane with a viscosity of 15 cP at 25° C. in which both ends were sealed with trimethylsilyl groups (10 parts by weight) and a polyether-modified organopolysiloxane with the following formula:

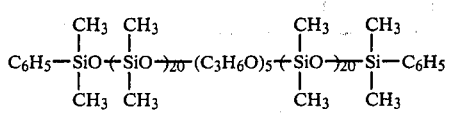

(10 parts by weight and 20 parts by weight) to produce specimens 3 and 4, respectively.

For comparison, the above-mentioned methylphenylvinylpolysiloxane (100 parts by weight) was combined with the above-mentioned methylhydrogenpolysiloxane (10 parts by weight) to produce comparison specimen 2.

150 ppm of platinum, as platinum-vinylsiloxane complex, based on the sum of the methylphenylvinylpolysiloxane and methylhydrogenpolysiloxane were added to each composition and the resulting mixtures were thoroughly stirred. These compositions were coated on a glassine paper at 0.9 g/m². A cured film was formed by heating the coated film at 150° C. for 30 seconds to form a peelable paper.

The prepared paper was allowed to stand in the air for 10 minutes with the cured film surface on top. An adhesive, SK Daine 801B, was then applied and the applied surface was heated for drying. The results of the tests are reported in Table II. For specimens 3 and 4, the peeling resistance was relatively low compared to comparison specimen 2 and was very stable.

TABLE II

| | Surface potential V | Peeling resistance, g/5 cm | | Residual adhesiveness % | Blocking g/4 cm |
| --- | --- | --- | --- | --- | --- |
| | | After aging for one day | After aging for 30 days | | |
| Specimen 3 | 2000 | 21 | 26 | 93 | 4 |
| Specimen 4 | 1500 | 18 | 21 | 92 | 4 |
| Comparison Specimen 2 | 6300 | 34 | 98 | 95 | 4 |

EXAMPLE 3

A raw methylvinylpolysiloxane rubber (98 mol % dimethylsiloxane units and 2 mol % methylvinylsiloxane units) with hydroxyl groups at both ends (100 parts by weight) was combined with a methylhydrogenpolysiloxane with a viscosity of 20 cP at 25° C. in which both ends were dimethylhydrogensilyl groups (3 parts by weight) and a polyether-modified organopolysiloxane with the following formula:

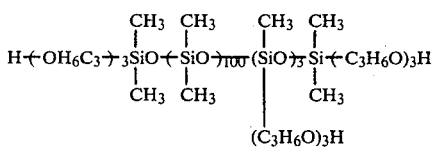

(6 parts by weight, 15 parts by weight and 25 parts by weight). The respective mixtures were dissolved in toluene (1800 parts by weight) to produce specimens 5, 6 and 7.

For comparison, the above-mentioned raw methylvinylpolysiloxane rubber (100 parts by weight) was combined with the above-mentioned methylhydrogenpolysiloxane (3 parts by weight) and the mixture was dissolved in toluene (1800 parts by weight) to produce a comparison specimen 3. 160 ppm of platinum as a platinum/vinylsiloxane complex based on the sum of raw methylvinylpolysiloxane rubber and methylhydrogenpolysiloxane were added to each solution. These mixtures were coated on polyethylene-kraft paper laminates at 0.5 g/m². A peelable paper was prepared by heating the coated paper at 150° C. for 30 seconds.

The prepared paper was allowed to stand in air for 30 minutes with the cured film surface on top. An adhesive, Olibain BPS-5127, was applied and the coated surface was heated for drying. The characteristics of the prepared films (specimens 5, 6 and 7 and comparison specimen 3 are reported in Table III. The surface potential was relatively low and the peeling resistance was also low. A small change in the peeling resistance was observed with time. Since the surface potential was low, the quantity of composition was low while the surface was simultaneously uniformly coated without the appearance of cissing of the adhesive film.

TABLE III

| | Peeling resistace, g/5 cm | | | |
| | Surface potential V | After aging for one day | After aging for 30 days | Residual adhesiveness % | Blocks ing g/4 cm |
|---|---|---|---|---|---|
| Specimen 5 | 2600 | 17 | 25 | 95 | 4 |
| Specimen 6 | 1900 | 14 | 17 | 92 | 4 |
| Specimen 7 | 1500 | 13 | 15 | 92 | 4 |
| Comparison Specimen 3 | 5500 | 22 | 89 | 95 | 4 |

EXAMPLE 4

A raw methylvinylpolysiloxane rubber (98.4 mol % dimethylsiloxane units and 1.6 mol % methylvinylsiloxane units) in which both ends were dimethylvinylsilyl groups (100 parts by weight) was combined with a methylhydrogenpolysiloxane with a viscosity of 20 cP at 25° C. in which both ends were sealed with trimethylsilyl groups (2 parts by weight) and a polyether-modified organopolysiloxane with the following formula:

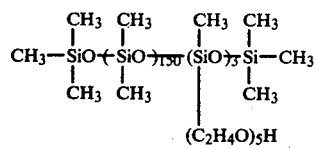

(5 parts by weight and 15 parts by weight). The respective mixtures were dissolved in toluene (1800 parts by weight) to produce specimens 8 and 9. For comparison, the above-mentioned raw methylvinylpolysiloxane rubber (100 parts by weight) was combined with the above-mentioned methylhydrogenpolysiloxane (2 parts by weight). This mixture was dissolved in toluene (1800 parts by weight) to produce comparison specimen 4. 400 ppm of platinum, as a platinum-butadiene complex based on the sum of methylvinylpolysiloxane and methylhydrogenpolysiloxane were added to each solution. These mixtures were coated on a glassine paper at 0.8 g/m². A peelable paper was prepared by heating the coated paper at 140° C. for 60 seconds. The prepared paper was allowed to stand in air for 30 minutes with the cured film surface on top. An adhesive, SK Daine 801B, was applied and the coated surface was heated for drying. The characteristics of the prepared films are reported in Table IV. For specimens 8 and 9, the effect of the atmosphere was minimal and the peeling resistance was very stable.

TABLE IV

| | Peeling resistance, g/5 cm | | | |
| | Surface potential V | After aging for one day | After aging for 60 days | Residual adhesiveness % | Blocking g/4 cm |
|---|---|---|---|---|---|
| Specimen 8 | 1300 | 17 | 19 | 91 | 3 |
| Specimen 9 | 600 | 14 | 14 | 90 | 4 |
| Comparison Specimen 4 | 6100 | 33 | 119 | 94 | 4 |

EXAMPLE 5

A raw methylphenylvinylpolysiloxane rubber (92 mol % dimethylsiloxane units, 4 mol % methylphenylsiloxane units and 4 mol % methylvinylsiloxane units) containing hydroxyl end groups (100 parts by weight) was combined with a methylhydrogenpolysiloxane (50 mol % dimethylsiloxane units and 50 mol % methylhydrogen siloxane units) with a viscosity of 20 cP at 25° C. in which both ends were sealed with trimethylsilyl groups (6 parts by weight) and an alcohol-modified organopolysiloxane with the following formula:

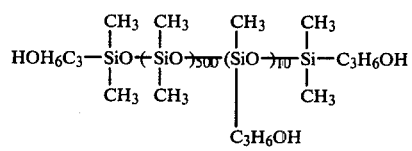

(5 parts by weight and 10 parts by weight). The respective mixtures were dissolved in toluene (1300 parts by weight) to produce specimens 10 and 11. For comparison, the above-mentioned raw methylphenylvinylpolysiloxane rubber (100 parts by weight) was combined with the methylhydrogenpolysiloxane (6 parts by weight) and this mixture was dissolved in toluene (1300 parts by weight) to produce comparison specimen 5. For comparison specimen 6, a condensation-reaction type raw dimethylpolysiloxane rubber containing hydroxyl groups at both ends (100 parts by weight) was combined with the above-mentioned methylhydrogenpolysiloxane (6 parts by weight) and the mixture was dissolved in toluene (1300 parts by weight). For specimens 10, 11 and comparison specimen 5, 250 ppm of platinum, as a platinum-vinylsiloxane complex based on the sum of methylphenylvinylpolysiloxane and methylhydrogenpolysiloxane were added to each solution.

For comparison specimen 6, dibutyltin 2-ethylhexoate (4 parts by weight) was added to the prepared solution as a curing catalyst. These solutions were applied to the corona treated surface of a polyester film at 0.6 g/m². The coated surface was then heat treated at 140° C. for 90 seconds. The coated film was allowed to stand in air for 30 minutes with the cured film surface on top. An adhesive, SK Daine 801B, was applied and the coated surface was heated for drying. The characteristics of the prepared films are reported in Table V. In comparison specimen 5, the surface potential was relatively high and a large variation occurred in the peeling resistance with time. In comparison specimen 6 which employs a condensation type component, the peeling resistance changed relatively little with time. For specimens 10 and 11, the surface potential was also lower and the change in peeling resistance with time was minimal. In addition, no blocking appeared. These films exhibited excellent characteristics.

TABLE V

| | Surface potential V | Peeling resistance, g/5 cm | | Residual adhesiveness % | Blocking g/4 cm |
|---|---|---|---|---|---|
| | | After aging for one day | After aging for 30 days | | |
| Specimen 10 | 2100 | 18 | 22 | 92 | 3 |
| Specimen 11 | 1900 | 16 | 19 | 91 | 4 |
| Comparison Specimen 5 | 7800 | 36 | 120 | 96 | 3 |
| Comparison Specimen 6 | 4000 | 23 | 40 | 93 | greater than 200 |

That which is claimed is:

1. In a curable composition for forming peelable films, said composition being obtained by mixing components comprising
   (a) an organopolysiloxane having a viscosity greater than 100 cP at 25° C. and having at least two silicon-bound vinyl groups per molecule,
   (b) an organohydrogenpolysiloxane containing at least two silicon-bound hydrogen radicals per molecule and
   (c) a catalytic amount of a metal catalyst for an addition reaction of silicon-bound vinyl groups with silicon-bound hydrogen radicals, the improvement comprising incorporating in the curable compositions
   (d) at least one organopolysiloxane bearing at least one silicon-bonded radical selected from the group consisting of alcohol radicals having the formula —$R^1OH$ and polyether radicals having the formula —$(OR^1)_lOR^2$, —$(R^1O)_kR^2$, —$(R^1O)_lR^2$ or —$O(R^1O)_k$—, wherein $R^1$ denotes an alkylene radical, $R^2$ denotes a hydrogen radical or an inactivating endgroup, k is an integer greater than 2 and l is an integer greater than 1, there being in the improved composition from 1 to 40 parts by weight of component (d) for every 100 parts by weight of the total of components (a) and (b).

2. The improved composition of claim 1 wherein component (d) is an organopolysiloxane which bears a multiple number of lower alcohol radicals.

3. The improved composition of claim 1 wherein component (d) is an organopolysiloxane which bears lower alkylene polyether radicals.

4. The improved compositions of claims 1, 2 or 3 wherein component (c) is platinum or a platinum compound.

* * * * *

UNITED STATES PATENT AND TRADEMARK OFFICE
CERTIFICATE OF CORRECTION

PATENT NO. : 4,248,750

DATED : February 3, 1981

INVENTOR(S) : Ichiro Murakami, Shosaku Sasaki, & Masamitsu Tanimura

It is certified that error appears in the above-identified patent and that said Letters Patent are hereby corrected as shown below:

In the ABSTRACT, line 1; the word reading "pellable" should read "peelable".

In the ABSTRACT, line 15; the word reading "pellable" should read "peelable".

In Column 5, lines 19-22; the formula reading

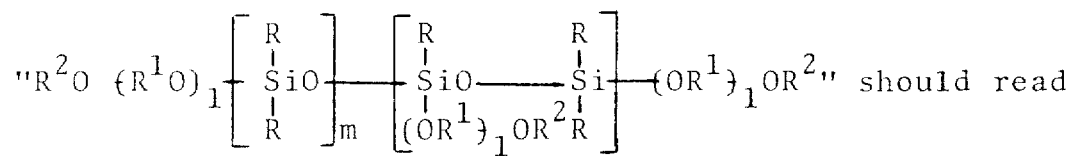 should read

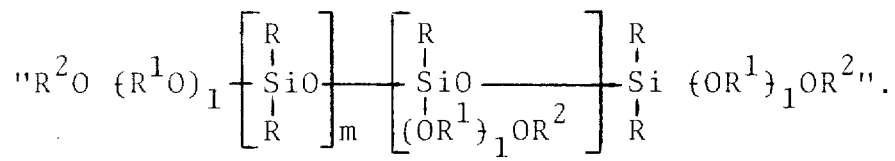.

In Column 8, line 20; the line reading "150 ppm of platinum, as platinum-vinylsiloxane com-" should read "150 ppm of platinum, as a platinum-vinylsiloxane com-".

UNITED STATES PATENT AND TRADEMARK OFFICE
CERTIFICATE OF CORRECTION

PATENT NO. : 4,248,750

DATED : February 3, 1981

INVENTOR(S) : Ichiro Murakami, Shosaku Sasaki, & Masamitsu Tanimura

It is certified that error appears in the above-identified patent and that said Letters Patent are hereby corrected as shown below:

In Column 9, line 28; the word reading "Blocks" should read "Block-".

*Signed and Sealed this*

*Thirteenth* Day of *October 1981*

[SEAL]

*Attest:*

*Attesting Officer*

GERALD J. MOSSINGHOFF

*Commissioner of Patents and Trademarks*